United States Patent
Reytier et al.

(10) Patent No.: US 9,238,871 B2
(45) Date of Patent: Jan. 19, 2016

(54) ARCHITECTURE OF HIGH TEMPERATURE ELECTROLYSER, WITH HIGH TARGET PRODUCTION PER ELECTROLYSIS CELL AND LIMITED CELL DEGRADATION RATE

(75) Inventors: Magali Reytier, Villard (FR); Pierre Baurens, Roybon (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 524 days.

(21) Appl. No.: 13/634,029

(22) PCT Filed: Mar. 11, 2011

(86) PCT No.: PCT/EP2011/053726
§ 371 (c)(1),
(2), (4) Date: Nov. 2, 2012

(87) PCT Pub. No.: WO2011/110677
PCT Pub. Date: Sep. 15, 2011

(65) Prior Publication Data
US 2013/0043123 A1 Feb. 21, 2013

(30) Foreign Application Priority Data
Mar. 12, 2010 (FR) ...................... 10 51789

(51) Int. Cl.
*C25B 1/06* (2006.01)
*C25B 9/10* (2006.01)
(Continued)

(52) U.S. Cl.
CPC ... *C25B 9/18* (2013.01); *C25B 1/06* (2013.01); *C25B 9/04* (2013.01); *C25B 9/10* (2013.01); *C25B 15/08* (2013.01); *Y02E 60/366* (2013.01)

(58) Field of Classification Search
None
See application file for complete search history.

(56) References Cited

U.S. PATENT DOCUMENTS

| 5,399,251 A | 3/1995 | Nakamats |
| 8,317,986 B2 | 11/2012 | Le Gallo |

(Continued)

FOREIGN PATENT DOCUMENTS

| EP | 0 250 043 A1 | 12/1987 |
| EP | 1 482 585 A1 | 12/2004 |

(Continued)

OTHER PUBLICATIONS

Herring, J. Stephen, et al, Progress in high-temperature electrolysis for hydrogen production using planar SOFC technology, International Journal of Hydrogen Energy vol. 32, No. 4, Mar. 2007, pp. 440-450.*

(Continued)

*Primary Examiner* — Harry D Wilkins, III
(74) *Attorney, Agent, or Firm* — Oblon, McClelland, Maier & Neustadt, L.L.P.

(57) ABSTRACT

A device for high temperature electrolysis of water, including: at least one elementary electrolysis cell including a cathode, an anode, and an electrolyte intermediate between the cathode and the anode; a first device forming an electrical and fluid interconnector including a metallic part delimited by at least one plane, the metallic part including an internal chamber and plural holes distributed on the surface, approximately perpendicular to the plane and opening up on the plane and in the chamber, the plane of the first interconnector being in mechanical contact with a plane of the cathode. The device can achieve a uniform current density in each electrolysis cell and can increase steam usage ratio in each electrolysis cell.

21 Claims, 6 Drawing Sheets

(51) Int. Cl.
*C25B 9/18* (2006.01)
*C25B 9/04* (2006.01)
*C25B 15/08* (2006.01)

(56) References Cited

U.S. PATENT DOCUMENTS

| | | | |
|---|---|---|---|
| 2004/0137306 A1* | 7/2004 | Turpin et al. | 429/37 |
| 2005/0115825 A1* | 6/2005 | Frank et al. | 204/253 |
| 2005/0221161 A1 | 10/2005 | Komada et al. | |
| 2007/0092775 A1 | 4/2007 | Komada et al. | |
| 2007/0105000 A1* | 5/2007 | Chapman et al. | 429/38 |
| 2007/0160892 A1* | 7/2007 | Yamada et al. | 429/38 |
| 2007/0163889 A1* | 7/2007 | Kato et al. | 205/637 |
| 2009/0098433 A1 | 4/2009 | Komada et al. | |
| 2009/0169970 A1 | 7/2009 | Komada et al. | |
| 2010/0062317 A1 | 3/2010 | Selcuk | |
| 2010/0200422 A1 | 8/2010 | Le Gallo et al. | |
| 2010/0266931 A1* | 10/2010 | Reytier et al. | 429/508 |
| 2012/0325652 A1 | 12/2012 | Perret | |
| 2012/0325654 A1 | 12/2012 | Le Gallo et al. | |
| 2012/0325677 A1 | 12/2012 | Le Gallo | |
| 2013/0032490 A1 | 2/2013 | Le Gallo et al. | |

FOREIGN PATENT DOCUMENTS

| | | | |
|---|---|---|---|
| FR | 2925487 | * | 6/2009 |
| JP | 7-145492 A | | 6/1995 |
| JP | 9-176884 A | | 7/1997 |
| JP | 2631571 B2 | | 7/1997 |
| JP | 2001-279480 A | | 10/2001 |
| JP | 2004-359987 A | | 12/2004 |
| WO | WO 2005/093129 A1 | | 10/2005 |
| WO | WO 2007/021054 A1 | | 2/2007 |
| WO | WO 2008/003976 A1 | | 1/2008 |

OTHER PUBLICATIONS

Office Action issued Oct. 27, 2014 in Japanese Patent Application No. 2012-556536 (with English language translation).

French Preliminary Search Report issued Oct. 29, 2010, in Patent Application No. FR 1051789 (FA 736143) (with English translation of Category of Cited Documents).

L. G. J. De Haart, et al., "Stack Degradation in Dependence of Operation Parameters; the Real-SOFC Sensitivity Analysis", B1002—Abstract 121—Oral Presentation—Session B10—Durability and Integrity, (8$^{th}$ European Solid Oxide Fuel Cell Forum), Jun. 30 - Jul. 4, 2008, 13 pages.

Xianguo Li, et al., "Review of Bipolar Plates in PEM fuel cells: Flow-field designs", International Journal of Hydrogen Energy 30, 2005, pp. 359-371.

U.S. Appl. No. 14/124,275, filed Dec. 6, 2013, Planque.

International Search Report issued May 27, 2011, in International application No. PCT/EP2011/053726.

* cited by examiner

ARCHITECTURE OF HIGH TEMPERATURE ELECTROLYSER, WITH HIGH TARGET PRODUCTION PER ELECTROLYSIS CELL AND LIMITED CELL DEGRADATION RATE

CROSS-REFERENCE TO RELATED APPLICATION

This application is a U.S. national phase application under 35 U.S.C. §371 of PCT/EP2011/053726, filed on Mar. 11, 2011, and claims the benefit of priority under 35 U.S.C. §119 from prior French Patent Application No. 10 51789, filed on Mar. 12, 2010, the entire contents of each of which are incorporated herein by reference.

TECHNICAL FIELD

The invention relates to a high temperature steam electrolyser (HTSE) also called a high temperature electrolyser (HTE).

In particular, it relates to a new HTSE electrolyser architecture to obtain a target production per electrolysis cell typically exceeding 370 gh/m$^2$ at 1.3V, while limiting the cell degradation rate.

PRIOR ART

High temperature steam electrolysis is currently envisaged preferentially for massive production of hydrogen. The high temperature and the passage of steam can reduce the electrical energy necessary for electrolysis in comparison with other hydrogen production processes such as low temperature alkaline electrolysis.

This gain in the necessary energy is counterbalanced by the negative effects of high temperature and a shorter life for HTE electrolysers using high temperature electrolysis (HTE). This shorter life is mainly due to degradation of the electrolysis cells from which the HTE electrolyser is made.

The degradation rate of cells depends firstly on the maximum local production density, and secondly on the temperature and to a lesser extent on the steam usage ratio (also called the conversion ratio).

Concerning the maximum local production density, it has been demonstrated for example that an increase in the current density from 0.5 A/cm$^2$ to 0.7 A/cm$^2$ can increase the degradation rate by a factor of 2.5 [1].

Furthermore, the increase to high temperatures (>>200° C.) requires the use of a ceramic electrolyte that is intrinsically brittle. This brittleness leads to a high scrap ratio during the manufacturing of cells and a high risk of structural failure (breakage) of the electrolysis cell during assembly and during operation. The consequence of the latter point is that the size of the cells is limited and this is a major critical parameter for the technical-economic viability of this process.

At the moment, the target production per cm$^2$ of cell is more than 370 gh/m$^2$ at 1.3V.

The inventors have attempted to define a high temperature electrolyser (HTE) with an architecture capable of reaching at least this production while limiting the degradation rate of electrolysis cells from which it is made.

Therefore, they made an inventory of essential functions to be performed by an HTE electrolyser and the structures of elements from which it is made, as they exist at the moment and their disadvantages.

An HTE electrolyser must perform the following essential functions:

supply and/or collection of current at the electrodes of each electrolysis cell, supply of steam and collection and evacuation of gases originating from the electrolysis reaction at the electrodes of each cell, conversion of the chemical energy of reactive gases into electrical energy, leak tightness of compartments, regarding the anode and cathode within which the reactions take place, supply/collection of cell gases for each electrolysis cell, temperature management, mechanical management of the stack of electrolysis cells when starting and during operation itself.

The elements that make up an HTE electrolyser are usually:

electrolysis cells, each composed of a cathode, an anode and an electrolyte inserted between the cathode and the anode and within which the electrolysis reaction occurs. There are so-called electrolyte support cells (the electrolyte thickness, typically 100 µm, is greater than the electrode thickness) and so-called cathode support cells (the cathode thickness, typically 500 µm, is greater than the thickness of the electrolyte and the anode). The performances of these cathode support cells are greater but their failure rate may be higher, interconnection, electrical and fluid devices that usually perform the functions of supplying and collecting current and that delimit gas circulation compartments, fluid connections, currently called manifolds, that supply steam, and collect and evacuate the gases (O2, H2) produced, seals between the different elements mentioned above and the outside of the electrolyser.

Concerning the interconnection devices, FIGS. 1, 1A and 1B, show a frequently used channel plate 1. Current is brought to or collected from the electrode by teeth or ribs 10 that are in direct mechanical contact with the electrode concerned. The steam supply to the cathode (or the gas draining the anode) is shown symbolically by the arrows in FIG. 1. Hydrogen produced at the cathode (or oxygen produced at the anode) is collected through channels 11 that open up into a fluid connection, usually called a manifold common to the cell stack.

The structure of this type of interconnection devices is made to achieve a compromise between the supply function and the collection function (gas/current).

The major disadvantages of this channel plate can be summarised as follows.

Firstly, the surface of an electrolysis cell cannot be used uniformly. The electrochemical reaction takes place close to the interface between the electrode and the electrolyte, and the gas, electrons and ions concerned have to be present at the same location, and while it is easy to supply electrons to the zones under the teeth 10 of the collector, it is difficult to supply them with gas. The constraints are the permeability and thickness of the electrode in contact, and the width of the tooth 10. Similarly, it is difficult to supply electrons to the area under the channel 11, since existing electrodes at the present time all have low effective conductivity. The constraints are the effective conductivity, and the thickness and width of the channel 11. The inventors believe that the ratio R between the current delivery/collection area and the steam delivery or produced gas collection area is a parameter representative of real use of the cell surface. In the case of an interconnection channel plate 1, the ratio R calculated below is often less than 50%.

R=1/(1+w/L), where w is the width of the channel 11 and L is the width of the tooth 10.

This plate structure 1 then implies a differentiation between production zones with some zones in which production densities and therefore current densities may be very high although the mean density is low, and therefore with local sources of performance degradation. This is shown locally (millimetric scale) in FIG. 1B in which very strong current lines are shown located at the ribs 10. Similarly, considering the electrode surface, current lines are stronger along the input direction than along the output direction, because of the change in the water content in the gas flow between the upstream and downstream parts of the channels. Similarly, this plate structure 1 implies a non-uniform steam supply to the channels 11 and strong supercharging of this steam is necessary (surplus water equal to more than 100% of consumed water is added) to guarantee a uniform and stable supply for all channels 11, making it difficult to achieve a high steam usage ratio. Conditioning and pressurising of this steam have a non-negligible impact on the consumption of energy associated with the electrolyser.

There is also a mechanical risk that a cell will be loaded in bending if there is a large geometric offset between the teeth of an interconnecting plate 1 on the anode side and the teeth of an interconnecting plate on the cathode side, where the teeth can punch and crack the cell if there are any lack-of-planeness defects. Very high precision in the relative assembly of plates on each side of the cell and very high tooth manufacturing quality are necessary to avoid this risk.

Furthermore the channel structure on the anode side with an inlet and an outlet is only useful when a draining gas is used to evacuate oxygen produced outside the cell. Conditioning of this draining gas also induces a significant energy cost.

Finally, this plate structure requires a large material thickness for the produced gas collection zone and shaping (machining) that can be prohibitive. Thin plates and stamping are used but limit manufacturing possibilities for the width of each tooth and the pitch between teeth.

The inventor also considers that the reduction in non-homogeneity of currents supplied to each cell with such an interconnecting channel plate 1 can only be limited.

Another interconnecting plate 1' has already been disclosed [2]. This plate is shown in FIG. 2 with fluid circulation shown by arrows; it has an interdigitised type structure. It only partially solves the problem of electrical supply. It does not solve the problem of mechanical bending mentioned for plate 1 and it can cause hydraulic tearing of the electrode with which it is in contact.

Concerning fluid connections (manifolds), the connections are usually made partly within the cells and interconnecting plates; openings are drilled in them through which steam is brought in and the gases produced ($H_2$, $O_2$) are evacuated. This has several disadvantages:
loss of expensive materials,
difficult machining in practice,
if there is any leak on these inlets/outlets, the leak is always in the hydrogen and oxygen production zone. Any combustion (flame) is then supplied by these two gases present on each side and will create hot points. This irremediably leads to cell breakages.

The immediate consequence is a drop in the yield due to loss of part of the production. Unfortunately, this can eventually destroy the entire stack of cells.

Seals are conventionally made by using glass paste seals because they have two essential advantages, namely good electronic insulation and a good seal without any mechanical clamping being required. On the other hand, the major disadvantages of these glass paste seals are:
difficulty in filling in the entire thickness of a cathode support cell (porous and thick) while guaranteeing a good long term seal between two anode and cathode compartments,
the need to machine the groove in which the glass fits,
impossibility of having a so-called "ceiling" HTE electrolyser design because it requires a vertical design to keep the seal in its groove,
since it is impossible to design a ceiling HTE electrolyser, differentiated compression with greater compression of cells at the bottom of the stack due to the weight of the stack, which limits the number of stacked cells,
the need for a temperature excursion beyond the operating temperature to make the seal; this excursion is harmful for metallic materials and therefore implies greater degradation,
difficulty in maintaining a seal under a high differential pressure (>100 mbars),
difficulty in maintaining a low leakage rate due to operating temperature variations (thermomechanical failure of the glass film),
emissions of $SiO_2$ vapours polluting for the electrodes.

Therefore, the main purpose of the invention is to propose a new architecture of a high temperature electrolyser HTE that does not have the above-mentioned disadvantages or only have some of them and that can produce target production per cell, typically more than 370 gh/m² at 1.3V while limiting the cell degradation rate.

One particular purpose of the invention is to achieve a uniform production density per electrolysis cell and a high steam usage ratio (or conversion ratio) per cell.

PRESENTATION OF THE INVENTION

To achieve this, the purpose of the invention is a high temperature water electrolysis device comprising:
at least one elementary electrolysis cell formed from a cathode, an anode, and an electrolyte intermediate between the cathode and the anode,
a first device forming an electrical and fluid interconnector composed of a metallic part delimited by at least one plane, said metallic part comprising an internal chamber and a plurality of holes distributed on the surface, approximately perpendicular to the plane and opening up on the plane and in the chamber, the plane of the first interconnector being in mechanical contact with the plane of the cathode.

All different shapes of holes can be envisaged within the scope of the invention including holes with a circular, oblong section or elongated slits.

For the purposes of the invention, a fluid and electrical interconnector refers to a system for delivering or collecting a current and a fluid to and from an electrode of an electrolysis cell. Thus, an electrolysis device according to the invention may comprise a single electrolysis cell with a first interconnector in contact with its cathode and a second interconnector described below in contact with its anode. Similarly, as described below, an interconnecting plate in a stack of electrolysis cells according to the invention may comprise a first interconnector in contact with the cathode of one elementary electrolysis cell and a second interconnector in contact with the anode of the adjacent electrolysis cell.

Advantageously, the ratio between the area of the holes and the area of the plane is less than 50%, preferably less than 30% and even more preferably equal to not more than 10%.

The number and/or size and/or distribution of the holes is determined so as to limit pressure losses of the fluid circulating in the cathode in contact with the plane of the first interconnector. The number and/or the size of the holes and/or their distribution as a function of the operating pressure could be determined by performing design calculations using the ANSYS FLUENT software version 12, as disclosed in French application entitled "*High temperature water electrolysis device with improved operation*" number 1051781.

Thus according to the invention, the production density from each electrolysis cell is more uniform and the steam usage (or conversion) ratio is better than is possible with HTE electrolyser architectures according to the state of the art.

The fact that a plurality of holes open up onto the cathode plane means firstly that the electrical behaviour of the entire surface of the cell can be uniform at all points with a limited electrical contact resistance between the cathode and the first interconnector.

Similarly, due to the plurality of holes, steam can be injected directly into the chamber into which all holes lead or through the cathode which, unlike the state of the art, limits the concentration and activation overvoltage. Similarly, collection through each hole of some of the hydrogen produced as the steam passes through can result in obtaining a higher steam usage ratio and more uniform than is possible with an interconnecting channel plate according to the state of the art as shown in FIG. 1. This can also result in more uniform production at the surface of the cell, due to better uniformity of the steam pressure.

As mentioned above, care is taken to ensure that fluid pressure losses in the cathode are not too high and that the surface areas of the holes in the first interconnector enable efficient evacuation of hydrogen and a sufficient current density to achieve a target production. Calculations carried out for target production densities of 370 gh/m$^2$ at a steam pressure of 30 bars and at 700° C., show that the maximum pressure loss with a cathode usually with a thickness of 1 mm and a diameter of 130 mm supplied through the thickness at the periphery of the cathode, is less than 1 bar.

Finally, compared with interconnecting plates according to the state of the art, the material cost and machining of a first interconnector to the cathode according to the invention are minimised.

Advantageously, the electrolysis device according to the invention comprises a second device forming an electrical and fluid interconnector consisting of a metallic part delimited by at least one plane, said metallic part comprising a chamber on the inside and a plurality of holes distributed on the surface, approximately perpendicular to the plane and opening up on the plane and in the chamber, the plane of the second interconnector being in mechanical contact with the plane of the anode.

Furthermore, unlike a plate with an interdigitised structure according to the state of the art as shown in FIG. 2, this avoids all problems of mechanical bending of the cell because by making a second interconnector to the anode similar to the first interconnector to the cathode, the cell is held in position continuously over its entire surface between said first and second interconnectors. This also avoids hydraulic tearing problems of electrodes according to the state of the art.

Care is taken that the holes in the second interconnector to the anode are uniformly distributed and optimised for the working pressure. Care is also taken to assure that the holes are sufficiently small (<1 mm diameter) and sufficiently well distributed to avoid separation or local tearing of the anode.

With such an interconnector to the anode, unlike an interconnecting plate according to the state of the art, the entire anode surface is used and the entire surface of the cell can have a uniform hydraulic behaviour because the hydraulic thrust due to the evacuation of oxygen produced on the anode is uniform and limited. Finally, having a completely closed oxygen recovery chamber can make better use of this oxygen.

With the interconnector to the anode according to the invention, no more draining gas is used to evacuate oxygen produced, with the following advantages:
- the lack of any draining gas can limit the energy bill of the electrolysis process,
- the lack of draining gas at the anode can eliminate the need for a seal and distribution manifold.

According to one preferred embodiment, the production of hydrogen produced and oxygen produced can be increased by providing a stack of elementary electrolysis cells each formed from a cathode, an anode and an electrolyte inserted between the cathode and the anode, an interconnecting plate comprising first and second interconnectors being arranged between two adjacent elementary cells, such that the plane of the first interconnector is in mechanical contact with the cathode of one of the two elementary cells and the plane of the second interconnector is in mechanical contact with the anode of the other of the two elementary cells.

According to one advantageous variant embodiment, the interconnecting plate is composed of three metallic plates assembled together at their periphery, the first and the second plates each comprising a plurality of holes distributed on their surface, approximately perpendicular to their thickness and opening up on its two plane faces, the third plate comprising at least one groove opening up on one of the faces of the first plate facing the plurality of holes and at least one groove opening up on one of the faces of the second plate, the space delimited between each groove and the first and second plates respectively forming one of the two chambers. In other words, with only three plates assembled together at their periphery by welding or soldering, a complete interconnector can be obtained between two adjacent elementary electrolysis cells in the same stack, in other words so that an electrical current can be brought to one electrode and steam can be brought to the cathode of one cell, and hydrogen can be collected at the cathode of the cell and oxygen can be collected at the anode of the other of the two cells. These three plates can advantageously be made from ferritic stainless steel plates with 22% chromium.

Appropriate clamping means can be used to apply a determined contact force between two plates on each side of the stack of cells. The result is that each cell in the stack is supported, avoiding any bending or punching.

The clamping pressure is thus more uniform than clamping on pads.

Preferably, the device comprises a first seal arranged at the periphery of the anode of one cell and in direct mechanical contact with the electrolyte of said cell and the second interconnector. This first seal may be a mechanical seal because it bears on the electrolyte that is an electrical insulator.

Concerning the steam supply and collection of the hydrogen produced, it is possible to either:
- supply the edge of the cathode, in other words its thickness around the periphery with high pressure steam in an environment in direct contact and thus recover the hydrogen produced through each of the hole and the chamber,
- or supply the chamber with high pressure steam and recover hydrogen produced through the edge of the cathode in an environment inert to hydrogen.

Unlike electrolysers according to the state of the art, these possible means of supplying steam or collecting hydrogen through the edge of the cathode according to the invention eliminate the need for a seal that is difficult to make on thick ceramic (cermet) and to integrate either a steam supply part or a produced hydrogen evacuation part into the stack of cells.

In other words, according to one advantageous embodiment, there is:
- a sealed envelope adapted to contain high pressure steam, the thickness around the periphery of the cathode being in direct contact with the inside of the sealed envelope,
- a first fluid connection opening up inside the sealed envelope to supply high pressure steam,
- a second fluid connection connected to the chamber of the first interconnector and opening up outside the sealed envelope for the collection and evacuation respectively of hydrogen produced at the cathode,
- a third fluid connection connected to the chamber of the second interconnector and opening up at the outside of the sealed envelope for the collection and evacuation respectively of oxygen produced at the anode.

The second fluid connection advantageously comprises a channel for collection and evacuation of hydrogen produced at the cathode of a cell made in the metallic part of the first interconnector located at a distance from said cell. In other words, the hydrogen recovery manifold can be taken outside the stack of cells in a steam environment non-reactive to the collected hydrogen and at a slight excess pressure. Therefore, unlike a stack of electrolysis cells according to the state of the art, there is no need to make expensive and difficult cut-outs of cells to make the manifolds.

To simplify assembly, two collection and evacuation channels for hydrogen produced at the cathode of two adjacent elementary cells are advantageously provided facing each other.

Preferably, it would be possible that the two channels are separated from each other by a first perforated spacer, a second seal in direct mechanical contact with the first perforated spacer and with the first interconnector of one of the two elementary cells and a third seal in direct mechanical contact with the first perforated spacer and with second interconnector of the other of the two elementary cells, the height of the first perforated spacer and the second and third seals in the compressed state being approximately equal to the thickness of an electrolysis cell.

The third fluid connection advantageously comprises a collection and evacuation channel for oxygen produced at the anode of a cell made in the metallic part of the second interconnector, at a distance from said cell. In other words, the oxygen recovery manifold can be taken outside the stack of cells in a steam environment that is not reactive to the collected oxygen. Therefore, unlike a stack of electrolysis cells according to the state of the art, there is no need to make expensive and difficult cut-outs of cells to make the manifolds.

The assembly can also be simplified by arranging matters such that the two collection and evacuation channels for oxygen produced at the anode of two adjacent elementary cells are advantageously facing each other.

Preferably, the two channels are separated from each other by a second perforated spacer, a fourth seal in direct mechanical contact with the second perforated spacer and the first interconnector of one of the two elementary cells and a fifth seal in direct mechanical contact with the second perforated spacer and the second interconnector, the height of the second perforated spacer and the fourth and fifth seals in the compressed state being approximately equal to the thickness of an electrolysis cell.

Preferably, the first, second, third, fourth and fifth seals are metallic.

The use of metallic seals can overcome the disadvantages of a glass paste seal used in electrolysers according to the state of art, and particularly poor resistance to pressure and use in gravity positions. The proposed architecture can thus be envisaged in a horizontal structure, which does not limit the number of stacked cells.

The mechanical force applied on each cell is then the same and is independent of the number of cells making up the stack.

Alternately, according to another embodiment, the embodiment may comprise:
- a sealed envelope, the inside of which is in direct contact with the thickness around the periphery of the cathode,
- a first fluid connection connected to the chamber of the first interconnector to supply high pressure steam to the cathode,
- a second fluid connection opening up inside the sealed envelope to evacuate hydrogen produced at the cathode,
- a third fluid connection connected to the chamber of the second interconnector to collect oxygen produced at the anode and opening up outside the sealed envelope to evacuate this oxygen produced at the anode.

A particularly well adapted electrolysis device according to the invention has a circular cross section of the electrolysis cell.

The invention also relates to a hydrogen production assembly comprising a plurality of the devices described above.

BRIEF DESCRIPTION OF THE DRAWINGS

Other advantages and characteristics will become clearer after reading the detailed description given below with reference to the drawings among which.

DETAILED PRESENTATION OF PARTICULAR EMBODIMENTS

The interconnecting plates 1, 1' of HTE electrolysers according to the state of the art and shown in FIGS. 1, 1A, 1B and 2 have been commented on at length in the preamble. Therefore they will not be described below.

Symbols and arrows representing steam, hydrogen and oxygen paths are shown in all figures, for reasons of clarity.

High temperature electrolysis according to the invention may be done at temperatures of at least 450° C., and typically between 700° C. and 1000° C.

Figure 1:
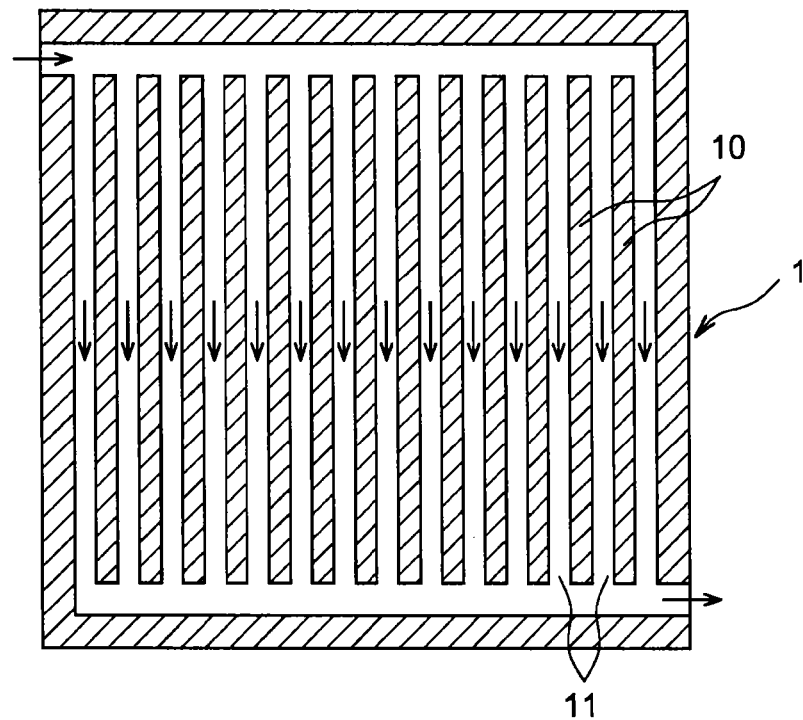
FIG. 1 shows a diagrammatic front view of an interconnecting plate of an HTE electrolyser according to prior art.
Figure 1A:
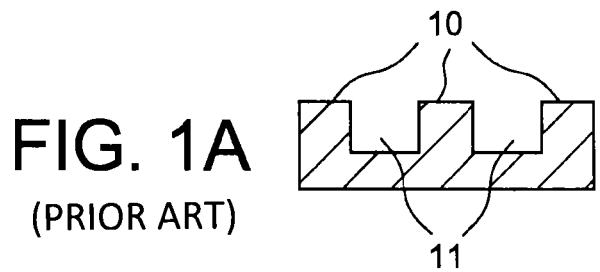
FIG. 1A shows a detailed sectional view of an interconnecting plate according to FIG. 1.
Figure 1B:
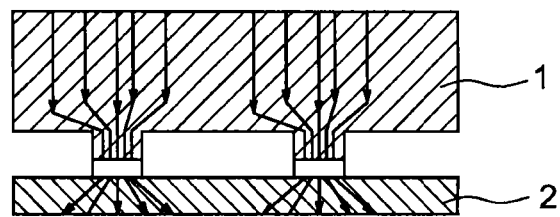
FIG. 1B shows a view corresponding to the view in FIG. 1A showing current lines passing through the plate.
Figure 2:
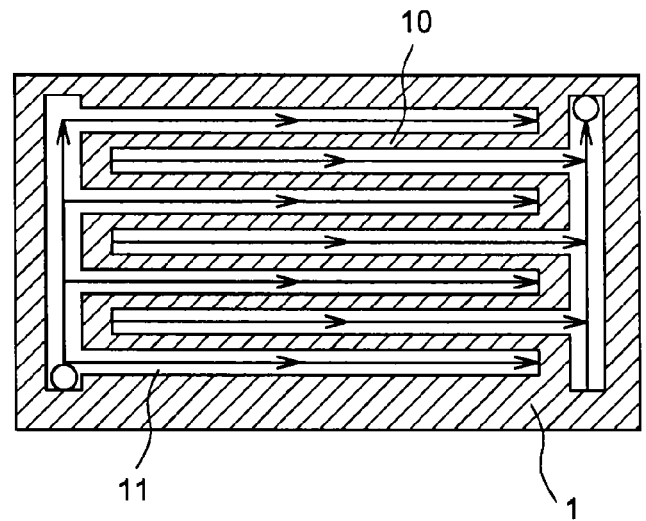
FIG. 2 is a diagrammatic front view of another interconnecting plate of an electrolyser according to the state of the art.
Figure 3:
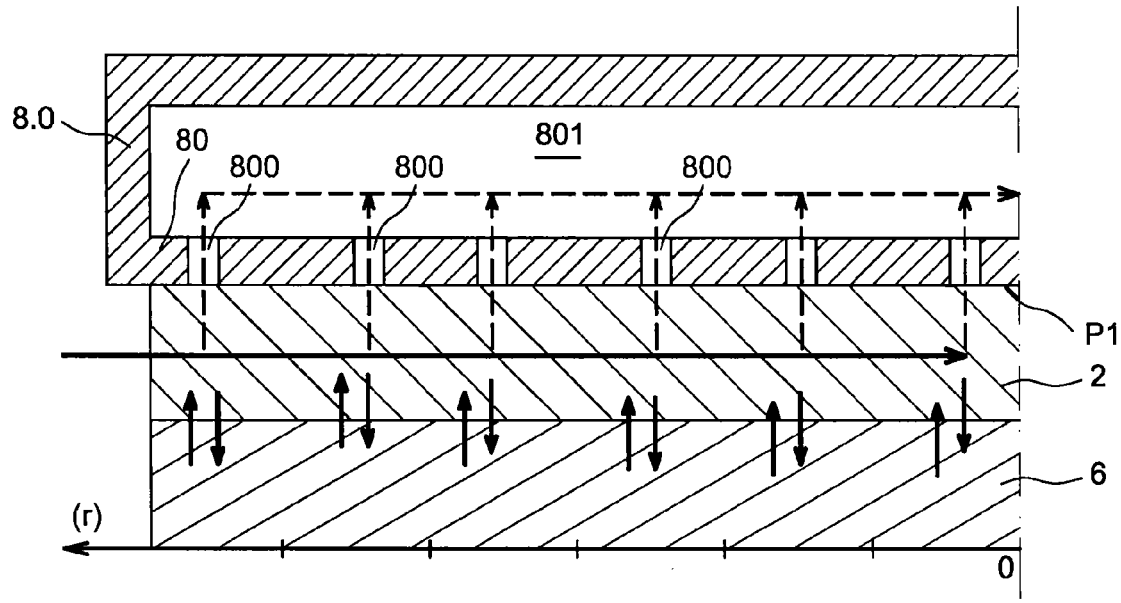
FIG. 3 is a sectional diagrammatic view of an electrolysis device according to the invention on the cathode side of a cell.
Figure 4:
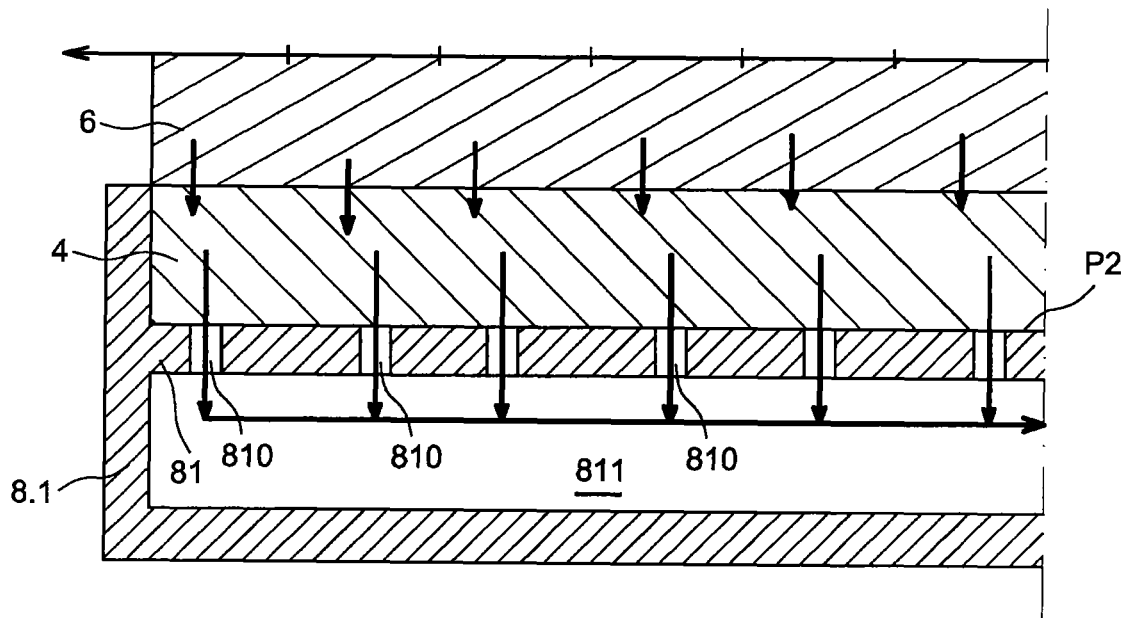
FIG. 4 is a sectional diagrammatic view of an electrolysis device according to the invention on the anode side of a cell.

An electrolysis device according to the invention as shown in FIGS. 3 and 4 includes an elementary electrolysis cell formed from a cathode 2, an anode 4, and an electrolyte 6 between the cathode and the anode. All electrolytes 6 are solid.

According to the invention, there is a first device 8.0 forming an electrical and fluid interconnector composed of a metallic part 80 delimited by at least one plane P1.

The metallic part 80 comprises a chamber 801 on the inside and a plurality of holes 800 distributed on the surface, approximately perpendicular to the plane P1 and opening up on this plane P1 and also into the chamber 801. The plane P1 of the first interconnector is in mechanical contact with the plane of the cathode 2.

As shown in FIG. 3, steam is injected directly to perform the electrolysis reaction directly over the entire edge of the cathode 2, in other words on the thickness around the periphery of the cathode. The injected steam (continuous line in FIG. 3) is transformed into hydrogen with uniform supply of electric current over the entire surface of the cell, part of the hydrogen (dashed lines in FIG. 3) is recovered uniformly through each of the holes 800.

Thus, the result obtained with such an electrolysis device according to the invention is a uniform current density and a high uniform usage ratio of steam over the entire surface of the cathode. The expression "steam usage ratio at the cathode" means the proportion of steam at the inlet to the cathode that is transformed by electrolysis into hydrogen at the cathode.

With a ratio between the area of the holes 800 and a total surface area of the plane P1 of the order of 2%, and a circular cross-section electrode usually made by silk screen printing about 1 mm thick and with a diameter of the order of 130 mm supplied with steam through the edge, the maximum pressure loss is less than 1 bar. Therefore, with the electrolysis device according to the invention, it is possible to achieve a uniform target production equal to at least 370 gh/m$^2$ per electrolysis cell with steam at a pressure of 30 bars and a temperature of about 700° C.

As shown in FIG. 4, a second device 8.1 is provided forming an electrical and fluid interconnector consisting of a metallic part 8.1 delimited by at least one plane P2, said metallic part comprising a chamber 811 on the inside and a plurality of holes 810 distributed on the surface, approximately perpendicular to the plane and opening up both on the plane P2 and in the chamber 811, the plane P2 of the second interconnector 8.1 being in mechanical contact with the plane of the anode 4.

In this case, the second interconnector 8.1 completely closes off the recovery chamber for oxygen produced at the anode 4. Therefore there is no inlet with a draining gas which by definition avoids leaks at this location, unlike the state of the art.

Figure 5:
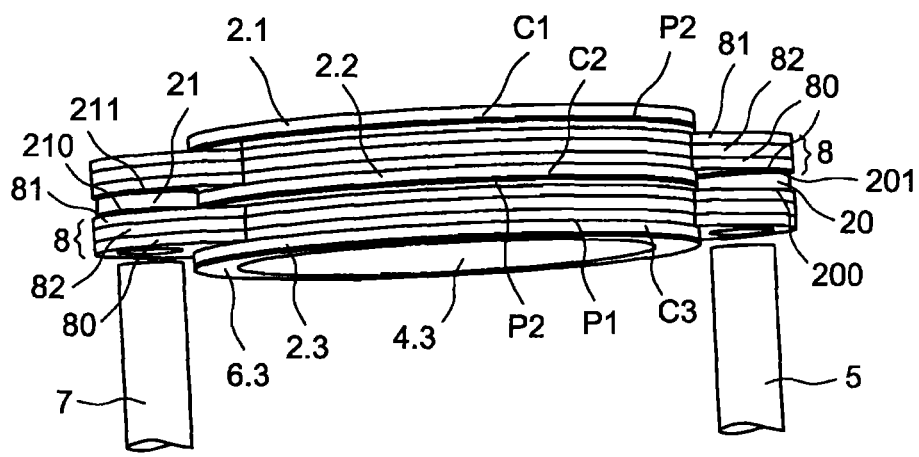
FIG. 5 is a perspective view of a device according to the invention comprising a stack of three electrolysis cells and two interconnecting plates arranged between two adjacent electrolysis cells.

As shown in FIG. 5, an HTE electrolyser according to this invention having the characteristics of the electrolysis device described above comprises a plurality of stacked elementary cells C1, C2, C3, ... Cn with a circular cross-section, called cathode support cells.

The cell C1 comprises a cathode 2.1 and an anode 4.1 between which there is an electrolyte 6.1 a few μm thick for the so-called cathode support cells.

Cell C2 comprises a cathode 2.2 and an anode 4.2 between which an electrolyte 6.2 is arranged.

The cathodes 2.1, 2.2 and the anodes 4.1, 4.2 are made by silk screen printing with a porous material and are more than 500 μm thick, typically of the order of 1 mm and 40 μm respectively. The cathode used is preferably a composite porous electrode made with a nickel and yttriated zirconia cermet.

The anode is preferably a composite porous electrode made of lanthanum strontium manganite and yttriated zirconia.

The cathode 2.2 of the cell C2 is electrically connected to the anode 4.1 of the cell C1 through an interconnecting plate 8 arranged between these two adjacent elementary cells C1 and C2. The interconnecting plate shown comprises the first 8.0 and second 8.1 interconnectors according to the invention described above.

Figure 6A:
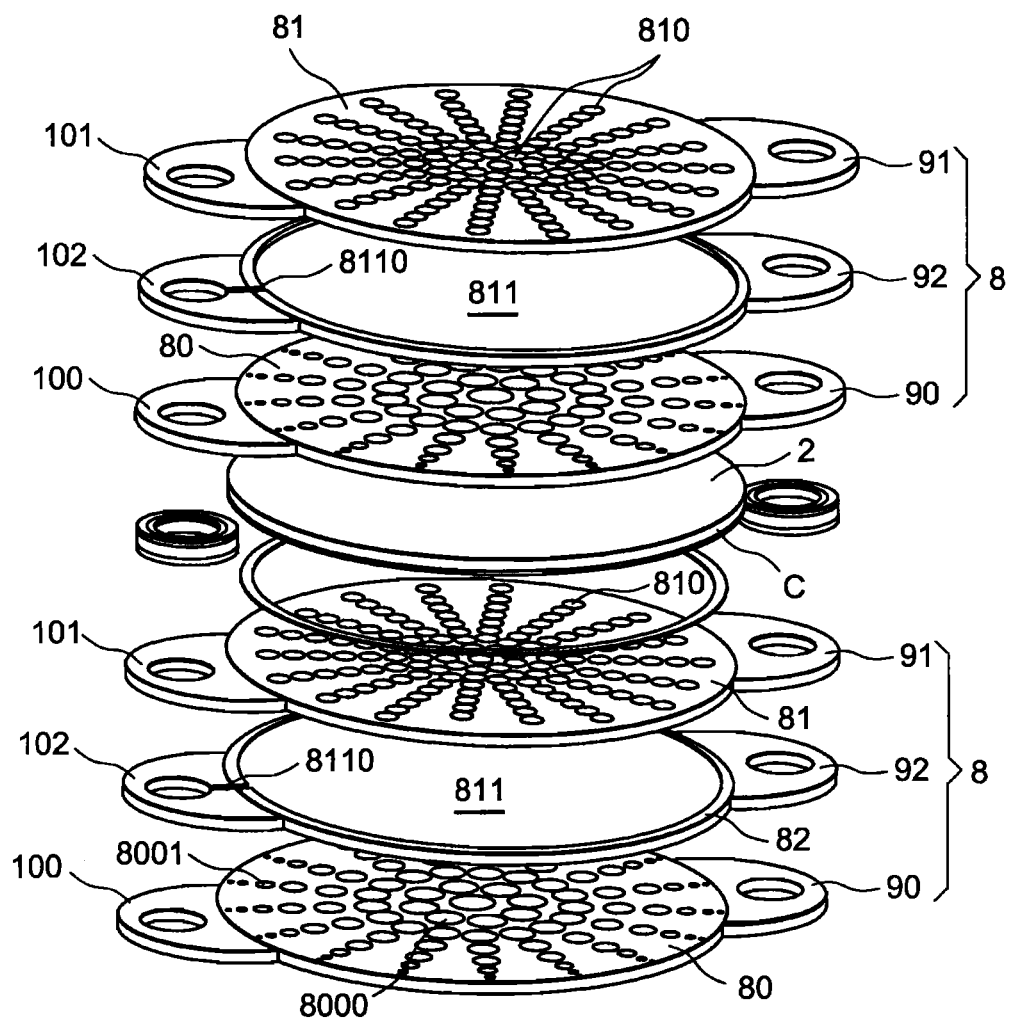
FIG. 6A is an exploded perspective view of the cathode side of a device according to the invention comprising an electrolysis cell and two interconnecting plates on each side of the cell.
Figure 6B:
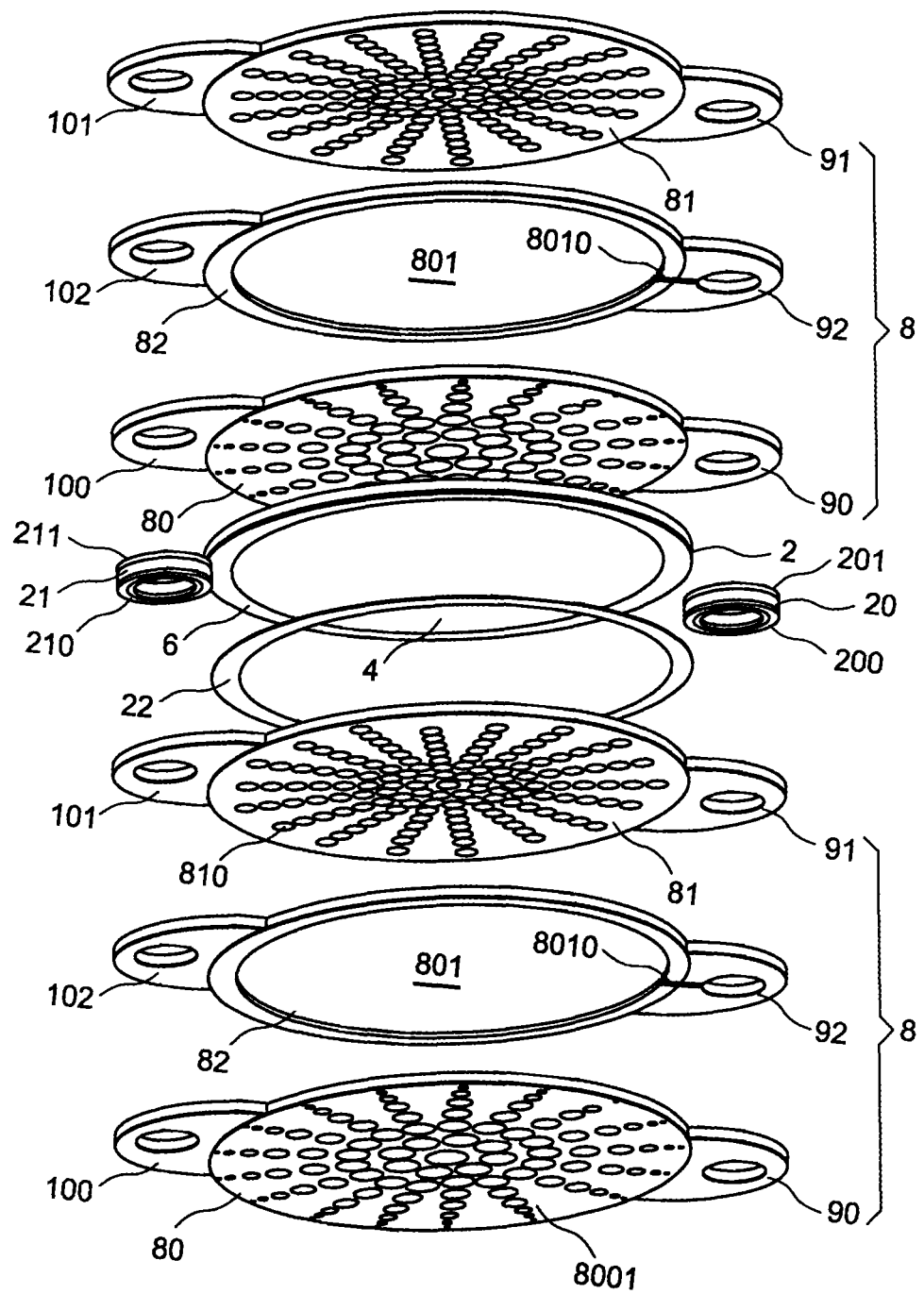
FIG. 6B is an exploded perspective view of the same device according to FIG. 6A but from the anode side.
Figure 7:
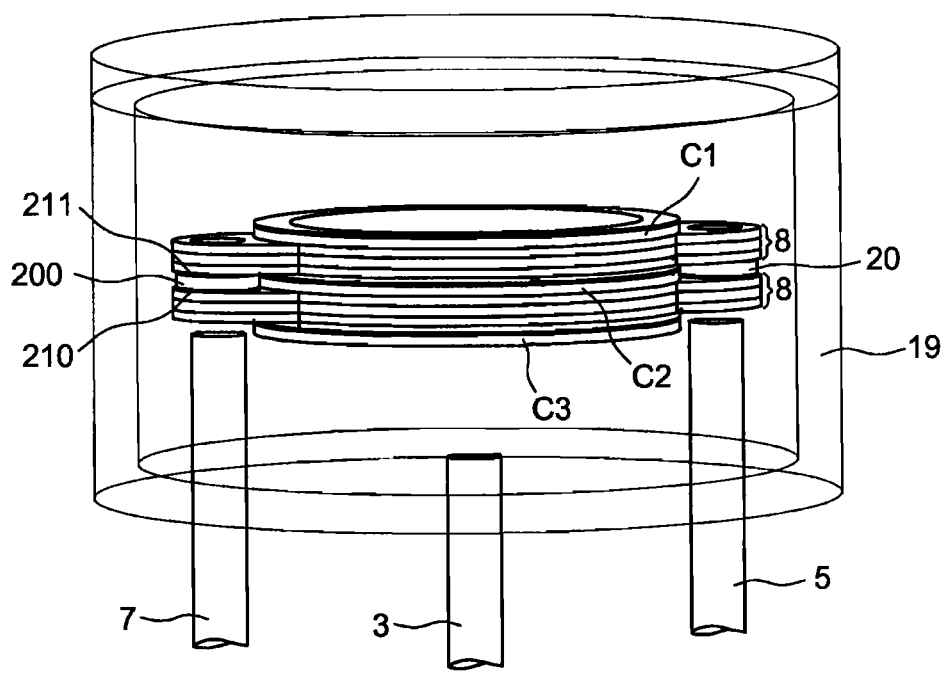
FIG. 7 is an internal transparent perspective view of a sealed envelope of an electrolysis device according to the invention.

As shown in the different FIGS. 5 to 7, each interconnecting plate 8 is composed of three metallic plates 80, 81, 82 assembled to each other around their periphery, typically by welding or soldering.

The first plate 80 and the second plate 81 each comprises a plurality of holes 800, 810 distributed on their surfaces, approximately perpendicular to their thickness and opening up on their two plane faces. The holes 800, 810 are different in the first plate 80 and the second plate 81.

More precisely, the number, size and distribution of the holes 800 in the first plate 80, in other words the plate in contact with a cathode 2.1, 2.2, 2.3 are optimised for the recovery of hydrogen so as to limit the pressure loss in crossing the porous cathode. Thus, as shown in FIGS. 6A and 6B, the holes 800 are in line along diameters at a uniform angular distribution; thus, each line of holes 800 is at 30° from an adjacent line of holes 800. As can be seen, the hole diameter increases from the outside of the plate towards its centre; thus, the diameters of the holes 8000 close to the centre of the plate 80 are larger than the diameters of the holes 8001 around the periphery. Typically, the diameters of the holes 8000 are of the order of 1 mm while the diameters of the holes 8001 are of the order of 1 mm. The distribution of holes 800 resembles the distribution in a shower head.

The holes 810 in the second plate 81 are all identical to each other and are in line at uniformly distributed diameters; each line of holes 810 is at 30° from an adjacent line of holes 800.

As can be better seen in FIGS. 6A and 6B, each of the plates 80, 81, 82 comprises two diametrically opposite eyelets 90, 100; 91, 101; 92, 102 at a distance from cells C1, C2, C3 respectively, in other words in a zone offset laterally from the zone of the cells. As will be explained later, the function of these eyelets 90, 100; 91, 101; 92, 102 is to evacuate the hydrogen and oxygen produced and to eliminate the need for any perforation of the cells C1, C2, Cn for this reason.

The three eyelets 90, 91, 92 of the plates 80, 81, 82 are facing each other, or in other words are vertically in line with each other. These three eyelets 90, 91, 92 form part of a collection and evacuation channel (or manifold) for hydrogen produced by a cell C1, C2, C3. More precisely, as can be seen in FIG. 6B, the collection chamber 801 for hydrogen produced at the cathode 2 of a cell opens up through a groove 8010 into the eyelet 92 through which hydrogen in fluid communication with the other two eyelets 90, 91 in the same connecting plate 8. As can also be seen in FIG. 6B, the two collection and evacuation channels for hydrogen produced at the cathode of two adjacent elementary cells C1, C2 are facing each other and are in line with each other; in other words, each assembly of eyelets 90, 91, 92 in fluid communication with a hydrogen collection chamber 801 at an elementary cell is also in hydraulic communication with a chamber 801 for collection of hydrogen from an adjacent elementary cell. Continuity of fluid communication is achieved while maintaining the seal between two adjacent eyelet assemblies 90, 91, 92, a perforated spacer 20 is provided with a metallic seal 200 in direct mechanical contact with the perforated spacer 20 and with the plate 81 of one of the two elementary cells around its eyelet 91, and a metallic seal 201 in direct mechanical contact with the perforated spacer 20 and with the plate 82 of the other of the two elementary cells.

The three eyelets 100, 101, 102 of the plates 80, 81, 82 are also facing each other or are in line with each other. These three eyelets 100, 101, 102 form a part of a collection and evacuation channel (or manifold) for oxygen produced by a cell C1, C2, C3. More precisely as can be seen in FIG. 6A, the collection chamber 811 for oxygen produced at the anode of a cell opens up through a groove 8110 in the eyelet 102 through which oxygen is in fluid communication with the other two eyelets 100, 101 in the same connecting plate 8. As can also be seen in FIG. 6A, the two collection and evacuation channels for oxygen produced at the anode of the two adjacent elementary cells C1, C2 are facing each other and are in line with each other; in other words, each assembly of eyelets 100, 101, 102 in fluid communication with an oxygen collection chamber 811 at an elementary cell is also in hydraulic communication with an oxygen collection chamber 811 from an adjacent elementary cell. To achieve continuity of fluid communication while maintaining the seal between two adjacent assemblies of eyelets 100, 101, 102, a perforated spacer 21 is arranged with a metallic seal 210 in direct mechanical contact with the perforated spacer 21 and with the plate 81 of one or the two elementary cells around its eyelet 101 and a metallic seal 211 in direct mechanical contact with the perforated spacer 21 and with the plate 82 of the other of the two elementary cells. In short, hydrogen and oxygen are collected and recovered by identical elements arranged in the same manner and symmetrically, the complete assembly provides a very compact collection and recovery. A metallic seal 22 arranged around the periphery of the anode 4 of a cell is in direct mechanical contact with the electrolyte 6 of said cell and the plate 81 through which the oxygen produced is evacuated. Thus, it is impossible for fluid to enter the anode and the anode is efficiently sealed using a single seal.

On the other hand, steam is supplied through the edge, in other words within the thickness at the periphery of each cathode 2, 2.1, 2.2, their porosity allowing said steam to pass through to bring it uniformly to their entire surface. The holes 800 recover the hydrogen produced uniformly.

Therefore there is no need for a seal around the cathode. As shown in FIG. 7, the steam supply takes place from the internal environment of a sealed envelope 19 that receives high pressure steam from the outside through a pipe 3.

The final assembly as shown in FIGS. 5 and 7 is such that the height of the perforated spacers 20, 21 and the seals 200, 201, 210, 211 in the compressed state is approximately equal to the thickness of an electrolysis cell, except for compression of the seal 22. Furthermore, a space is left between the edge of a cathode and the assembly composed of seals 20, 200, 201 and the assembly composed of seals 21, 210, 211 to enable supply of steam in this zone.

Obviously care will be taken in determining the size of the eyelets and therefore the hydrogen and oxygen evacuation channels (manifolds) as a function of the number of cells in a stack.

As can be seen in FIGS. 5 and 7, hydrogen produced from the channels formed by the eyelets 90, 91, 92 and the perforated spacers 20 with their corresponding seals 200, 201 is evacuated through a pipe 5 to the outside of the sealed envelope 19.

Similarly, as can be seen in FIGS. 5 and 7, oxygen produced from the channels formed by the eyelets 100, 101, 102 and the perforated spacers 21 with their corresponding seals 210, 211 is evacuated through a pipe 7 to the outside of the sealed envelope 19.

Even if they are not shown, clamping means are formed inside the sealed envelope to provide a determined contact force between two plates on each side of the stack of cells. The result obtained is uniform clamping over the entire area of each cell.

The architecture shown can be used with a stack of a very large number of horizontal cells.

Although not shown in detail, it is clear that one or several layers of material can be deposited on the interconnectors or the interconnecting plates.

Although not shown in detail, it is obvious that an embodiment using steam supplied through the chambers 801 and therefore through a pipe 5 and recovery of hydrogen produced through the edge of the cathodes 2 and through the pipe 3 in an environment inert to hydrogen in the sealed envelope would function.

The invention as it has just been described can achieve a uniform target production of at least 370 gh/m$^2$ at 1.3 Volt per electrolysis cell while limiting the degradation rate of each cell, due to a uniform current density over the entire area of the cell and a high uniform steam usage ratio (conversion ratio to hydrogen).

Thus, the invention proposes a steam inlet:

either by convection through the edge at the periphery and within the thickness of the cathode, and then hydrogen produced and the remaining steam leave perpendicular to the cathode through holes formed for this effect with graduated drawing off throughout the path along the cathode;

or through the chamber and then through the holes with recovery of hydrogen produced through the edge of the cathode at its periphery.

Furthermore, the architecture proposed according to the invention requires all-metal seals that are easy to install.

Other improvements can be envisaged without going outside the scope of the invention.

For example, any type of cathode with uniform porosity can be envisaged if it is suitable within the framework of the invention.

Since they function under steam pressure, cathodes with a lower porosity than those usually used can be envisaged, which can make them less brittle.

Similarly, the brittleness of uniform porous cathodes according to the invention can also be reduced by increasing their thickness.

Finally, cathodes with uniform porosity according to the invention may be made using silk screen printing as usual, or any other technique.

Furthermore, although the angle formed between the lines of holes is of the order of 30° in the embodiment shown, other angles could equally well be envisaged.

CITED REFERENCES

[1]: L. G. J de Haart, <<Stack degradation in dependence operation parameters>>. 8th European Solid Oxide Fuel Cell Forum//30 Jun.-4 Jul. 2008//Lucerne;
[2]: Xiango Li, International Journal of hydrogen Energy 30 (2005) 359-371.

The invention claimed is:

1. A device for high temperature electrolysis of water, comprising:
   a stack of elementary electrolysis cells each including a cathode, an anode, and an electrolyte intermediate between the cathode and the anode;
   a first device forming a first electrical and fluid interconnector including a metallic part delimited by at least one first plane, the metallic part comprising:
      a first internal chamber and a plurality of holes distributed on the surface, approximately perpendicular to the first plane and opening up on the first plane and in the first chamber, the first plane of the first interconnector being in mechanical contact with a first plane of the first cathode of a first cell of the stack,
      a first channel configured to collect or evacuate gas produced at the first cathode of the stack, the first channel being laterally offset from a zone of the first elementary electrolysis cell and extending in a direction substantially perpendicular to the first plane, and
      at least one first groove in fluid communication with the first internal chamber and the first channel, the at least one first groove extending in a direction substantially parallel to the first plane;
   a first perforated spacer, which separates the first channel from a third channel being configured to collect or evacuate hydrogen produced at a second cathode of a second cell of the stack;
   a first seal in direct mechanical contact with the first perforated spacer and a cathode side of the first cell of the stack; and
   a second seal in direct mechanical contact with the first perforated spacer and an anode side of the second cell of the stack.

2. The device for high temperature electrolysis of water according to claim 1, in which a ratio between an area of the holes and an area of the first plane is less than 50%.

3. The device for high temperature electrolysis of water according to claim 1, in which a ratio between an area of the holes and an area of the first plane is not more than 30%, or is less than 10%.

4. The device for high temperature electrolysis of water according to claim 1, in which a number and/or size and/or distribution of the holes is determined so as to limit pressure losses of fluid circulating in the cathode in contact with the first plane of the first interconnector.

5. The device for high temperature electrolysis of water according to claim 1, further comprising:
   a second device forming a second electrical and fluid interconnector including a metallic part delimited by at least one second plane, the metallic part comprising:
      a second internal chamber and a plurality of holes distributed on the surface, approximately perpendicular to the second plane and opening up on the second plane and in the second chamber, the second plane of the second interconnector being in mechanical contact with a first plane of the first anode of a second cell of the stack,
      a second channel configured to collect or evacuate gas produced at the first anode of the stack, the second channel being laterally offset from the zone of the second elementary electrolysis cell and extending in a direction substantially perpendicular to the second plane, and
      at least one second groove in fluid communication with the second internal chamber and the second channel, the at least one second groove extending in a direction substantially parallel to the second plane.

6. The device for high temperature electrolysis of water according to claim 5, further comprising:
   at least one interconnecting plate comprising the first and the second interconnectors arranged between two adjacent elementary cells of the stack, such that the first plane of the first interconnector is in mechanical contact with the cathode of one of two elementary cells of the stack, and the second plane of the second interconnector is in mechanical contact with the anode of the other of the two elementary cells of the stack.

7. The device for high temperature electrolysis of water according to claim 6, in which the at least one interconnecting plate includes three metallic plates assembled together at their periphery, the first and the second plates of the three metallic plates each comprising a plurality of holes distributed on their surface, approximately perpendicular to their thickness and opening up on their two plane faces, the third plate of the three metallic plates comprising the at least one first groove opening up on one of the plane faces of the first plate facing the plurality of holes and the at least one second groove opening up on one of the plane faces of the second plate, a space delimited between each of the first and second grooves and the first and second plates respectively forming one of the first and second chambers.

8. The device for high temperature electrolysis of water according to claim 7, further comprising:
   a sealed envelope configured to contain high pressure steam, a thickness around a periphery of the cathodes of the stack being in direct contact with the inside of the sealed envelope;
   a first fluid connection opening up inside the sealed envelope to supply the high pressure steam;
   a second fluid connection, connected to the first chamber of the first interconnector and opening up to an outside of the sealed envelope for collection and evacuation respectively of hydrogen produced at the cathodes of the stack; and
   a third fluid connection, connected to the second chamber of the second interconnector and opening up at the outside of the sealed envelope for collection and evacuation respectively of oxygen produced at the anodes of the stack.

9. The device for high temperature electrolysis of water according to claim 8, in which the second fluid connection comprises the first channel being configured for collection and evacuation of hydrogen produced at a first cathode of a first cell of the stack, the first channel being formed in the metallic part of the first interconnector located at a distance laterally offset from the first cell of the stack.

10. The device for high temperature electrolysis of water according to claim 9, in which the second fluid connection further comprises the third channel, the third channel being formed in the metallic part of the second interconnector located at a distance laterally offset from the second cell of the stack,
    wherein the first and second cells of the stack are adjacent elementary cells, and
    wherein the first and third channels face each other.

11. The device for high temperature electrolysis of water according to claim 10, in which the first seal is in direct mechanical contact with the first perforated spacer and with the first plate of the three metallic plates of the one of the two elementary cells of the stack, and the second seal is in direct mechanical contact with the first perforated spacer and with the second plate of the three metallic plates of the other of the two elementary cells of the stack, a height of the first perforated spacer and the second seals in a compressed state being approximately equal to a thickness of a single elementary cell of the stack.

12. The device for high temperature electrolysis of water according to claim 11, in which the first and the second seals are metallic.

13. The device for high temperature electrolysis of water according to claim 8, in which the third fluid connection comprises the second channel being configured for collection and evacuation of oxygen produced at a first anode of a first cell of the stack, and further comprises a fourth channel being configured for collection and evacuation of oxygen produced at a second anode of a second cell of the stack, the fourth channel being formed in the metallic part of the second interconnector located at a distance laterally offset from the second cell of the stack, wherein the first and second cells of the stack are adjacent elementary cells, and wherein the second and fourth channels face each other.

14. The device for high temperature electrolysis of water according to claim 13, in which the second and fourth channels are separated from each other by a second perforated spacer, a third seal is in direct mechanical contact with the second perforated spacer and with the first plate of the three metallic plates of the one of the two elementary cells of the stack, and a fourth seal is in direct mechanical contact with the second perforated spacer and with the second plate of the three metallic plates of the other of the two elementary cells of the stack, a height of the second perforated spacer and the third and fourth seals in a compressed state being approximately equal to a thickness of a single elementary cell of the stack.

15. The device for high temperature electrolysis of water according to claim 14, in which the third and fourth seals are metallic.

16. The device for high temperature electrolysis of water according to claim 6, further comprising clamping devices configured to apply a determined contact force between two interconnecting plates respectively disposed on each side of the stack of cells.

17. The device for high temperature electrolysis of water according to claim 6, further comprising:
a sealed envelope, an inside of which is in direct contact with a thickness around a periphery of the cathodes of the stack;
a first fluid connection connected to the first chamber of the first interconnector to supply high pressure steam to the cathodes of the stack;
a second fluid connection opening up inside the sealed envelope to evacuate hydrogen produced at the cathodes of the stack; and
a third fluid connection connected to the second chamber of the second interconnector and opening up outside the sealed envelope to collect and evacuate oxygen produced at the anodes of the stack, respectively.

18. The device for high temperature electrolysis of water according to claim 5, further comprising a metallic seal arranged at a periphery of the anode of the at least one cell and being in direct mechanical contact with the electrolyte of the cell and the second interconnector.

19. A hydrogen production assembly comprising a plurality of first and second devices according to claim 5.

20. The device for high temperature electrolysis of water according to claim 1, in which a cross-section of the at least one elementary electrolysis cell is circular.

21. The device for high temperature electrolysis of water according to claim 1, wherein the at least one first groove is disposed between the first internal chamber and the laterally offset first channel.

* * * * *